United States Patent [19]
Smith

[11] 3,757,969
[45] Sept. 11, 1973

[54] LATCHING ARRANGEMENT FOR TAILGATES

[75] Inventor: Harold E. Smith, Defiance, Ohio

[73] Assignee: Smithpac Canada Limited, Toronto, Ontario, Canada

[22] Filed: June 30, 1969

[21] Appl. No.: 837,481

[52] U.S. Cl.................... 214/83.3, 49/280, 49/245, 296/56
[51] Int. Cl............................................... B65f 3/00
[58] Field of Search.................. 214/83.3, 503, 504; 296/52, 56; 105/308, 309, 310, 378; 49/280, 236, 245, 255

[56] References Cited
UNITED STATES PATENTS
3,272,552 9/1966 Park............................... 49/280 X
3,440,763 4/1969 O'Brien........................... 296/56 X Primary Examiner—Albert I. Makay
Attorney—David H. Wilson and Donald R. Fraser

[57] ABSTRACT

A self-locking, -releasing, and -sealing latching arrangement is provided for a tailgate of a refuse truck. The tailgate is pivotally supported by the body of the truck in a manner to enable transverse movement of the pivot axis. The latching arrangement further includes latching pins and slotted latching plates which, when in cooperating relationship, hold the door closed firmly and tightly. The tailgate is opened and closed by a pair of fluid-operated cylinders which are positioned to first move the tailgate in a direction parallel to the slots of the latching plates in order to move the latching pins out of the slots, and then to effect pivotal movement of the tailgate relative to the body opening.

5 Claims, 4 Drawing Figures

Patented Sept. 11, 1973
3,757,969
2 Sheets-Sheet 1
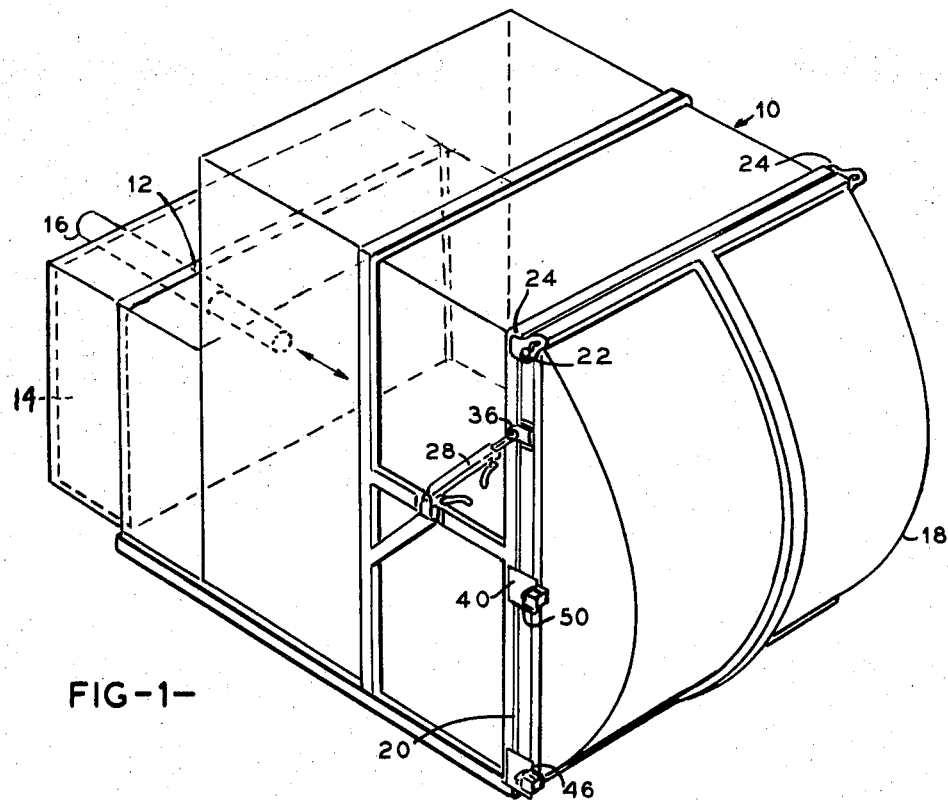
FIG-1-
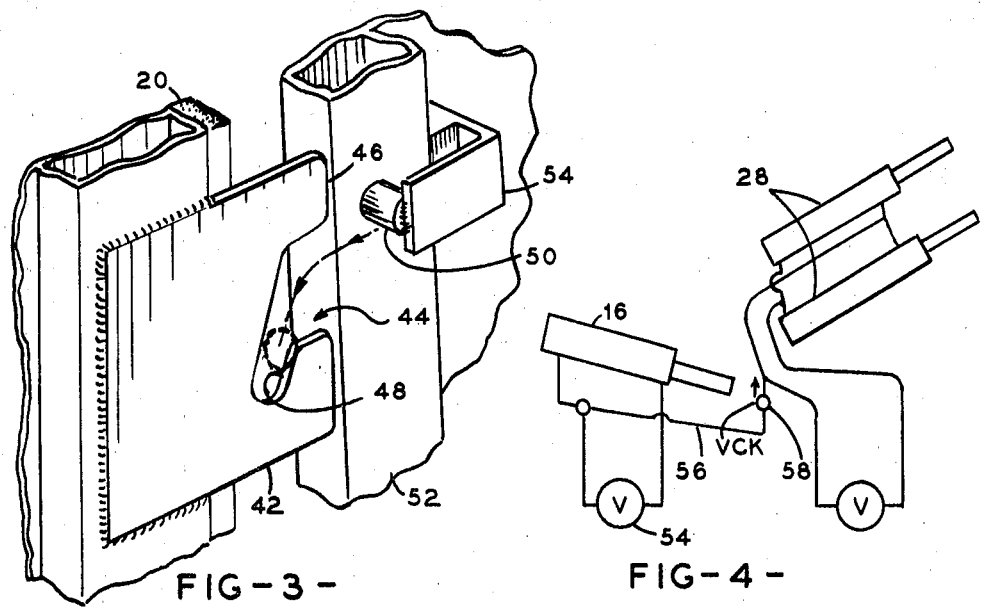
FIG-3-
FIG-4-
INVENTOR.
HAROLD E. SMITH

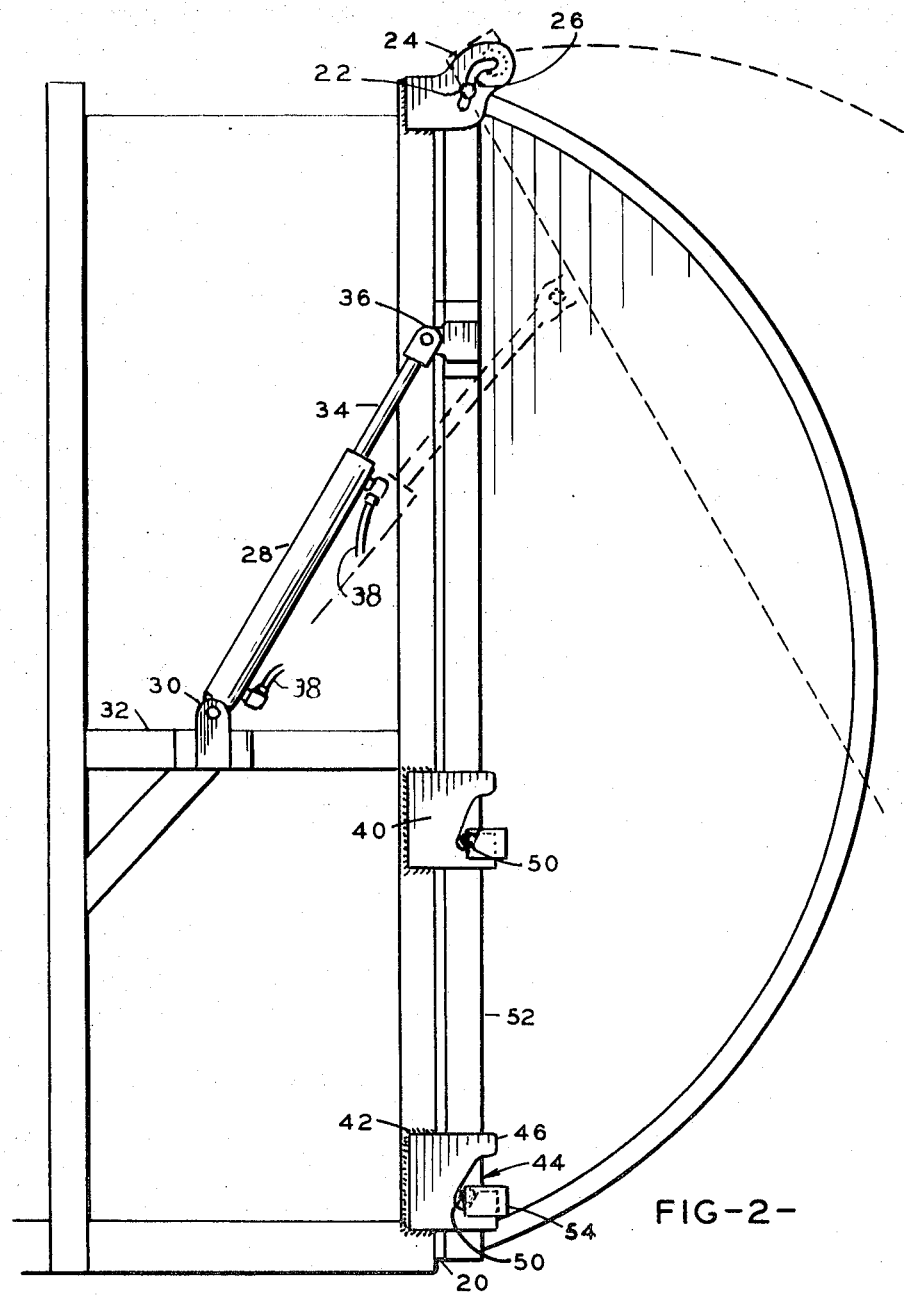

LATCHING ARRANGEMENT FOR TAILGATES

This invention relates to a closure member for a container and more specifically to a latching arrangement for a tailgate of a load-carrying vehicle.

The latching arrangement according to the invention is particularly useful for refuse vehicles employed in the collection and disposal of refuse but is also applicable for other vehicles which carry a load of a fluid or partially fluid nature, even including grain, for example. With such vehicles, an effective seal between the load-carrying body and the tailgate or other closure member is important to prevent leaks and spillage. The new latching arrangement always assures tight closure of the seal to prevent such spillage, which is particularly undesirable in the case of refuse.

The latching device according to the invention is also particularly desirable for refuse trucks in which the refuse is compacted under substantial pressure. Heretofore, with refuse vehicles of this nature, the pressure caused by the compacted refuse has on occasion forced open the tailgate or closure member, allowing the contents to be deposited on the ground at most unfortunate times and locations. The possibility that the tailgate could be released was particularly increased with the tailgates having curved interiors which directed the compressed refuse upwardly as it was forced rearwardly by the compacting ram.

The new latching device, however, holds the tailgate in the closed position in a manner to overcome such force. The power means for opening and closing the tailgate also is effective to hold the tailgate tightly closed in the sealed position during compacting of the refuse in the body. Further, since the latching arrangement is self-releasing, the tailgate also can be opened from the operator's cab without the necessity for the operator to move to the rear of the vehicle.

The new latching system according to the invention includes pivoted supports for the tailgate located at an edge portion thereof and designed to move transversely prior to the tailgate pivoting. The latching arrangement also includes slotted latching plates for receiving latching pins, with the slots disposed parallel to the direction in which the pivot axis moves so that the latching pins move lineally in the slots prior to pivotal movement of the tailgate. The movement of the pivot axis stops when the latching pins reach the openings of the slots, at which point further force exerted on the tailgate causes it to pivot and open to enable the contents of the vehicle body to be removed.

In the preferred form, the latching pins do not seat in the ends of the slots but along edges thereof in a manner to cam or force the tailgate against the body opening to place a compressive force on the seal therebetween and thereby increase the effectiveness of the seal. Preferably, fluid-operated cylinders are employed to open and close the tailgate with the piston rods of the cylinders being disposed so as to have at least a component of movement parallel to the directions of the slots of the latching plates. This provides the desired initial movement of the tailgate to move the latching pins out of the slots of the latching plates, prior to the pivotal movement of the tailgate. When the piston rods of the cylinders are then moved in a manner to close the tailgate, pressure can continue to be applied thereto to urge the doors more fully to the closed position, particularly when loading and compacting operations take place within the body.

It is, therefore, a principal object of the invention to provide a latching arrangement for a closure member of a load-carrying vehicle having the advantages and features discussed above.

Other objects and advantages of the invention will be apparent from the following detailed description of a preferred embodiment thereof, reference being made to the accompanying drawings, in which:

FIG. 1 is a somewhat schematic rear view in perspective of a refuse vehicle body having a tailgate with a latching arrangement embodying the invention;

FIG. 2 is an enlarged side view in elevation of a rear portion of the vehicle body and tailgate;

FIG. 3 is a further enlarged, fragmentary view in perspective of a latching plate and pin shown partially separated; and FIG. 4 is a diagrammatic view of a hydraulic system employed with fluid-operated cylinders of the vehicle.

Referring particularly to FIG. 1, a body of a vehicle, and particularly a refuse vehicle, is indicated at 10. The vehicle can be in the form of a truck which is moved from site to site to collect refuse or it can be in the form of a trailer which is towed to a given location, such as an apartment house or grocery store, where it can remain for a period of time, such as a week, during which refuse is periodically loaded. At the end of the period of time, another trailer can be left at the site and the present one removed to a dumping location and then towed to still another location for another period of time.

A loading hopper 12 is provided at a forward wall of the body into which refuse is deposited. The refuse is then moved rearwardly into the body by a ram 14 which is driven by a fluid-operated cylinder 16. When the body 10 is full, a tailgate or closure member 18 is opened to enable the contents to be dumped. This can be accomplished by tilting of the body 10 in a manner well known in the art or the cylinder 16 can be of a telescopic design and effective to move the ram 14 further rearwardly than occurs during the normal compacting operation to shove the refuse out the rear opening of the body 10.

A resilient sealing strip 20 is mounted on the body 10 around the rear opening thereof and is partially compressed when the tailgate 18 is closed. The latching arrangement according to the invention maintains the tailgate tightly against the sealing strip 20 to place it under compression and maintain an effective seal, particularly against liquids which may be present in the refuse. The latching arrangment also maintains an effective seal even though the sealing strip 20 becomes permanently compressed or wears over a period of time.

The tailgate 18 is pivotally supported by the body 10 near an edge of the tailgate and preferably near an upper edge. For this purpose, a pair of pivot projections or pins 22 extend outwardly from the sides of the tailgate at the upper edge thereof. Pivot plates 24 are affixed to the upper edge of the body, near the plane of the rear opening, and form slots 26 in which the pivot pins 22 are received. The pivotal axis at the center of the pivot pins 22 thereby can be moved transversely in the direction of and over the length of the slots 26 prior to pivotal movement of the tailgate 18 about this axis.

The tailgate 18 can be opened or closed by a number of means. As shown, fluid-powered and specifically hydraulically operated cylinders 28 have ends pivotally mounted by brackets 30 on horizontal frame members 32 of the body 10. Piston rods 34 of the cylinders extend outwardly and, in turn, are pivotally connected by brackets 36 to frame members of the tailgage 18. The cylinders 28 and the piston rods 34 are positioned so that, as the piston rods 34 extend outwardly, they place a component of force on the tailgate 18 which is parallel to the slots 26 of the pivot plates 23. Consequently, when the piston rods 34 are extended, they initially move the tailgate in an upward and rearward direction with the pivot pins 22 moving up to the upper edges of the slots 26. The upper ends of the slots 26 can be curved to move the tailgate more rearwardly near the end of the transverse travel of the pivot pins 22 and the pivot axis. When the pins 22 reach the ends of the slots 26, the tailgate 18 can be moved no further and since the cylinder 28 and piston rod 34 are positioned to place counterclockwise torque on the tailgate 18, as shown in FIG. 2, the tailgate will then pivot in a counterclockwise direction until the piston rod 34 is fully extended. Fluid is supplied to the cylinder 28 through lines 38 communicating with the ends of the cylinder.

Even when the tailgate is moved toward a closed position and the piston rods 34 are retracted, the pivot pins 22 will remain at the upper ends of the slots 26. This occurs because the bulk of the weight of the tailgate 18 and the center of gravity thereof are below the pivot brackets 36 of the piston rods 34, thereby urging the upper edge of the tailgate in an upper and clockwise direction even as the tailgate is lowered to a closed position in a clockwise direction.

The specific means by which the tailgate 18 is pivotally supported is not important as long as the pivot axis can move transversely prior to the pivotal opening movement of the door, and can close prior to the transverse movement back to the original position of the pivot axis.

The latching arrangement further includes a pair of latching plates 40 and 42 on each side which are substantially identical. The plates form slots or recesses 44 extending diagonally and generally parallel to the slots 26 of the pivot plate 24 with upper edges of the recesses curved rearwardly as at 46. The recesses 44 also form side latching edges 48 slanting downwardly and toward the body 10. Latching projections or pins 50, mounted on frame members 52 of the tailgate 18, ride on the edges 48 when the tailgate 18 is closed and thereby exert a camming force toward the body 10 with the tailgate 18 thereby maintaining the sealing strip 20 in compression. As the strip 20 wears or is permanently compressed, the pins 50 will ride further down on the edges 48 when the tailgate 18 is in a closed position and thereby compensate for the compression or wear. The upper edges 46 serve as guides in directing the latching pins 50 into and out of the recesses 44.

When the tailgate 18 is opened, and the pivot pins 22 initially move upwardly in the slots 26, the latching pins 50 similarly move with respect to the recesses 44 and the latching edges 48. Thus, by the time the pivot pins 22 reach the ends of the slots 26, the latching pins 50 will have moved to positions clear of the plates 40 and 42 and the edges 40 so that the tailgate 18 can then move rearwardly and open in a counterclockwise direction, as shown in FIG. 2.

To further assure that the tailgate 18 will be effectively locked, particularly when refuse is being packed in the body 10, fluid under pressure can be supplied to the rod end of the cylinder 28 through the upper line 38 during the compacting operation. The hydraulic circuit diagrammatically shown in FIG. 4 is effective to accomplish this purpose. Accordingly, when a valve 54 is opened to supply fluid under pressure to the blind end of the cylinder 16, to move the ram 14 into the body 10 to compact refuse, fluid under pressure can simultaneously be supplied through a line 56 and a check valve 58 to the rod end of the cylinders 28. This urges the piston rods 34 into the cylinders and urges the tailgate 18 downwardly so that the latching pins 50 will be urged further into the recesses 44 and along the latching edges 48 thereof to maintain the tailgate 18 securely in place. The check valve 58 will maintain the pressure in the rod ends of the cylinders 28 even when the valve 54 is operated to supply fluid to the rod end of the cylinder 16 to retract the ram 14. The check valve 58, however, will have no effect upon the operation of the cylinders 28 when it is desired to operate the associated valve to open the tailgate 18.

The latching system can be modified in a number of respects and still be functional. For example, the pivot and latching plates can be mounted on the tailgate with the pins mounted on the body. The pivot slots, latching edges, and power-operated cylinder can also be directed downwardly and rearwardly, rather than upwardly and rearwardly.

Various modifications of the above described embodiment of the invention will be apparent to those skilled in the art and it is to be understood that such modifications can be made without departing from the scope of the invention, the embodiment shown and described being primarily for purposes of illustration and not limitation.

I claim:

1. A refuse truck comprising a body for receiving a load of refuse and having a front opening through which refuse can be supplied, means for compacting the refuse in the body, said body having a rear opening through which the refuse can be removed, a tailgate for said refuse vehicle, means for pivotally supporting said tailgate at an upper edge thereof from said body, above the rear opening, said pivotally-supporting means enabling the pivot axis to move sideways in a path at an angle to the rear opening, latching pins associated with one of said body and said tailgate, latching plate means forming latching edges associated with the other of said tailgate and said body and having substantially straight portions positioned at angles to the rear opening of said body, said latching edges being positioned to be engaged by said projections when the tailgate is closed, to urge the tailgate toward the body, and power means for moving said tailgate in a manner to first move the pivot axis sideways in the path at an angle to the rear opening, when the tailgate is closed, and then pivot the tailgate toward an open position when said latching pins are clear of said latching edges.

2. A refuse vehicle according to claim 1 characterized by a resilient sealing strip affixed to one of said body and said tailgate to seal around the rear opening of said body when said tailgate is closed.

3. A refuse vehicle according to claim 1 characterized by said power-operated means comprising fluid-operated cylinders on each side of said body, said cylinders being pivotally affixed to portions of said body and pivotally affixed to portions of said tailgate above the center of gravity of said tailgate.

4. A refuse vehicle according to claim 1 characterized by said power-operated means comprising fluid-operated cylinders connected between said body and said tailgate and positioned to exert a component of force on said tailgate generally parallel to said latching edges and to the direction in which the pivot axis is moved.

5. A refuse vehicle according to claim 1 characterized by said means for pivotally supporting said tailgate comprising a pair of pivot pins affixed to one of said body and said tailgate, and pivot plates affixed to the other of said tailgate and said body and forming slots receiving said pivot pins, said slots being positioned generally parallel to said latching edges.

* * * * *